United States Patent
Khorami

(10) Patent No.: US 9,485,078 B2
(45) Date of Patent: Nov. 1, 2016

(54) POINT-TO-MULTIPOINT MICROWAVE COMMUNICATION

(71) Applicant: Skyriver Communications, Inc., San Diego, CA (US)

(72) Inventor: Saeed Sarikhani Khorami, San Diego, CA (US)

(73) Assignee: Skyriver Communications, Inc., San Diego, CA (US)

( * ) Notice: Subject to any disclaimer, the term of this patent is extended or adjusted under 35 U.S.C. 154(b) by 0 days.

(21) Appl. No.: 14/967,984

(22) Filed: Dec. 14, 2015

(65) Prior Publication Data

US 2016/0248576 A1 Aug. 25, 2016

Related U.S. Application Data

(63) Continuation of application No. 14/634,522, filed on Feb. 27, 2015, now Pat. No. 9,215,546, which is a continuation of application No. 13/629,294, filed on Sep. 27, 2012, now Pat. No. 8,989,162.

(60) Provisional application No. 61/539,834, filed on Sep. 27, 2011.

(51) Int. Cl.
| | |
|---|---|
| *H04J 3/00* | (2006.01) |
| *H04L 5/22* | (2006.01) |
| *H04B 1/04* | (2006.01) |

(Continued)

(52) U.S. Cl.
CPC .............. *H04L 5/22* (2013.01); *H04B 1/0458* (2013.01); *H04B 2001/0491* (2013.01); *H04W 84/12* (2013.01); *H04W 88/085* (2013.01)

(58) Field of Classification Search
None
See application file for complete search history.

(56) References Cited

U.S. PATENT DOCUMENTS

| | | |
|---|---|---|
| 6,324,379 B1 | 11/2001 | Hadden et al. |
| 7,013,121 B1 | 3/2006 | Koh |
| 7,613,249 B1 | 11/2009 | Tsai |

(Continued)

FOREIGN PATENT DOCUMENTS

| | | |
|---|---|---|
| CN | 2694631 Y | 4/2005 |
| CN | 1647404 A | 7/2005 |

(Continued)

OTHER PUBLICATIONS

International Search Report on corresponding PCT Application (PCT/US2012/057612) from International Searching Authority (KIPO) dated Mar. 18, 2013.

(Continued)

*Primary Examiner* — Otis L Thompson, Jr.
(74) *Attorney, Agent, or Firm* — Klein, O'Neill & Singh, LLP

(57) ABSTRACT

A microwave communication system may include subscriber stations in communication with a base station. The stations may include time duplex circuitry normally found in wireless local area networks (WLANs). Signals normally routed through antennas associated with such circuitry instead are routed through circuitry to perform frequency conversion to and from microwave communications frequencies, for communications over microwave links between the subscriber stations and the base station. In some embodiments the wireless circuitry is configured for multiple input multiple output (MIMO) operation with one antenna port dedicated for transmission of data and one antenna port dedicated to reception of data.

19 Claims, 11 Drawing Sheets

(51) Int. Cl.
*H04W 88/08* (2009.01)
*H04W 84/12* (2009.01)

(56) References Cited

U.S. PATENT DOCUMENTS

| | | |
|---|---|---|
| 8,346,293 B2 | 1/2013 | Abe et al. |
| 2003/0036410 A1 | 2/2003 | Judd et al. |
| 2003/0147472 A1 | 8/2003 | Bach et al. |
| 2003/0203718 A1 | 10/2003 | Wiswell |
| 2004/0053582 A1 | 3/2004 | Nakanishi et al. |
| 2005/0227631 A1 | 10/2005 | Robinett |
| 2006/0029146 A1 | 2/2006 | Catreux et al. |
| 2010/0099366 A1 | 4/2010 | Sugar et al. |
| 2010/0136922 A1 | 6/2010 | Rofougaran |
| 2011/0195675 A1 | 8/2011 | Nitsche |
| 2011/0260839 A1 | 10/2011 | Cook et al. |
| 2013/0012134 A1 | 1/2013 | Jin et al. |
| 2013/0107808 A1* | 5/2013 | He ............... H04W 56/001 370/328 |
| 2015/0181363 A1 | 6/2015 | Khorami |

FOREIGN PATENT DOCUMENTS

| | | |
|---|---|---|
| CN | 101166030 A | 4/2008 |
| CN | 101977081 A | 2/2011 |
| CN | 201919158 U | 8/2011 |
| EP | 2757704 A1 | 7/2014 |

OTHER PUBLICATIONS

Written Opinion on corresponding PCT Application (PCT/US2012/057612) from International Searching Authority (KIPO) dated Mar. 18, 2013.
Invitation pursuant to Rule 62a(1) EPC on related European Patent Application (12835636.7) from the European Patent Office (EPO) dated Jun. 5, 2015.
Extended European Search Report (EESR) dated Oct. 12, 2015 on related European Patent Application (12835636.7) from the European Patent Office (EPO).
Office Action on corresponding Chinese Patent Application No. 201280053331.0 from the State Intellectual Property Office (SIPO) dated Jun. 1, 2016.

* cited by examiner

POINT-TO-MULTIPOINT MICROWAVE COMMUNICATION

CROSS REFERENCE TO RELATED APPLICATIONS

This application is a continuation of U.S. patent application Ser. No. 14/634,522, filed Feb. 27, 2015, which is a continuation of U.S. patent application Ser. No. 13/629,294, filed Sep. 27, 2012, now U.S. Pat. No. 8,989,162, which claims the benefit of U.S. Provisional Application No. 61/539,834, filed on Sep. 27, 2011, the disclosures of which are incorporated herein by reference.

BACKGROUND OF THE INVENTION

The present invention relates generally to microwave communication and, more particularly, to point-to-multipoint microwave communication.

Digital microwave radio may be used to provide communication between locations. For example, mobile communication networks use microwave links to provide backhaul links from base stations. Digital microwave radio systems have progressed in both capacity and cost. However, most systems are point-to-point, that is, they only provide communication between two locations, or points, with each location having an antenna, a radio transceiver, and other associated electronics. A communication network made of point-to-point links is difficult to scale since adding a new location entails adding equipment both at the new location and another location, such as a base station, with which the new location will communicate over a microwave link.

BRIEF SUMMARY OF THE INVENTION

Aspects of the invention relate to microwave communication systems. In one aspect the invention provides a communication device for a microwave communication system, comprising: wireless communication circuitry including at least two antenna ports, with at least one of the two antenna ports configured for transmission only and at least one other of the two antenna ports configured for reception only; at least one transmit mixer coupled to the at least one antenna port configured for transmission, to upconvert a signal from the at least one antenna port configured for transmission to provide a transmit signal at microwave communication frequencies; and at least one receive mixer coupled to the at least one other antenna port configured for reception, to downconvert a received signal at microwave communication frequencies. In various further aspects: the wireless communication circuitry is part of an 802.11n device; the wireless communication circuitry is part of an 802.11ac device; the wireless communication circuitry is configured to transmit and receive signals at frequencies in the 2.4 GHz band; the wireless communication circuitry is configured to transmit and receive signals at frequencies in the 5 GHz band; the at least one transmit mixer is a direct conversion mixer; the at least one receive mixer is a direct conversion mixer; a transmit/receive switch is coupled to the at least one transmit mixer and the at least one receive mixer; a first local oscillator is coupled to the at least one transmit mixer, so as to provide a first local oscillator signal to the at least one transmit mixer; a second local oscillator is coupled to the at least one receive mixer, so as to provide a second local oscillator signal to the at least one receive mixer; a power amplifier is coupled to the at least one transmit mixer and the diplexer; a low noise amplifier is coupled to the at least one receive mixer and the diplexer; and/or the at least one transmit mixer and the at least one receive mixer are part of a radio frequency front end (RFFE) unit.

In another aspect the invention provides a method useful in providing microwave communications, comprising: presenting a signal for transmission on a first antenna port of a wireless communication device having multiple input multiple output (MIMO) capability; upconverting the signal for transmission to a microwave communications frequency; downconverting a received signal from a microwave communications frequency; and providing the downconverted signal to a second antenna port of the wireless access point device having MIMO capability. In various further aspects: the microwave communications frequency is between 6 GHz and 40 GHz; the signal for transmission is upconverted from frequencies in the 2.4 GHz band; the signal for transmission is upconverted from frequencies in the 5 GHz band; the received signal is downconverted to frequencies in the 2.4 GHz band; and/or the received signal is downconverted to frequencies in the 5 GHz band.

In another aspect the invention provides a communications device for a microwave communication system, comprising: wireless access point circuitry having multiple antenna ports, the circuitry configurable to place a first antenna port of the multiple antenna ports in a transmit only configuration and a second antenna port of the multiple antenna ports in a receive only configuration; a microwave radio frequency front end (RFFE) coupled to the first antenna port and the second antenna port, the microwave RFFE including circuitry to upconvert signals from the first antenna port to a microwave communications frequency and circuitry to downconvert signals to the second antenna port from a microwave communications frequency.

In another aspect the invention provides a point-to-multipoint microwave communication system, comprising: a microwave base station, comprising: a base station microwave antenna; wireless access point circuitry providing for communication of data with spatial diversity between transmission of signals and reception of signals, the wireless access point circuitry configured so as to transmit information from a first antenna port and receive information from a second antenna port, the first antenna port and the second antenna port being different antenna ports; and base station mixing circuitry for upconverting a signal received from the first antenna port from frequencies utilized in transmission of signals by the wireless access point to microwave communication frequencies and for downconverting a signal received from the base station microwave antenna from microwave communications frequencies to frequencies utilized in reception of signals by the wireless access point; a plurality of microwave subscriber stations, each comprising: wireless subscriber unit circuitry coupled to components of a subscriber station by way of a wired Ethernet connection, the wireless subscriber unit circuitry providing for communication of data with spatial diversity between transmission of signals and reception of signals, the wireless subscriber unit circuitry configured so as to transmit information from a first antenna port and receive information from a second antenna port, the first antenna port and the second antenna port being different antenna ports; a subscriber station microwave antenna; and subscriber station mixing circuitry upconverting a signal received from the first antenna port from frequencies utilized in transmission of signals by the wireless subscriber unit to microwave communication frequencies and for downconverting a signal received from the subscriber station microwave antenna from microwave communications frequencies to frequencies utilized in reception of signals by the wireless subscriber unit.

In another aspect the invention provides a communication device for a microwave communication system, comprising: an 802.11n or an 802.11ac device supporting at least a 2×2:1 MIMO configuration, the 2×2:1 configuration including at least a first antenna port configured for transmission only and at least a second antenna port configured for reception only; means for upconverting signals from the first antenna port to microwave communication frequencies; and means for downconverting signals intended for the second port from microwave communication frequencies.

In another aspect the invention provides a communication device for a microwave communication system, comprising: wireless communication circuitry including at least one antenna port, the wireless communication circuitry providing for time duplexed communications; a transmit/receive switch coupled to the at least one antenna port by way of a wired coupling; at least one transmit mixer coupled to the transmit/receive switch to upconvert a signal from the transmit/receive switch to microwave communication frequencies; and at least one receive mixer coupled to the transmit/receive switch to downconvert a received signal from microwave communication frequencies.

These and other aspects of the invention are more fully comprehended upon review of this disclosure.

DETAILED DESCRIPTION

Figure 1:
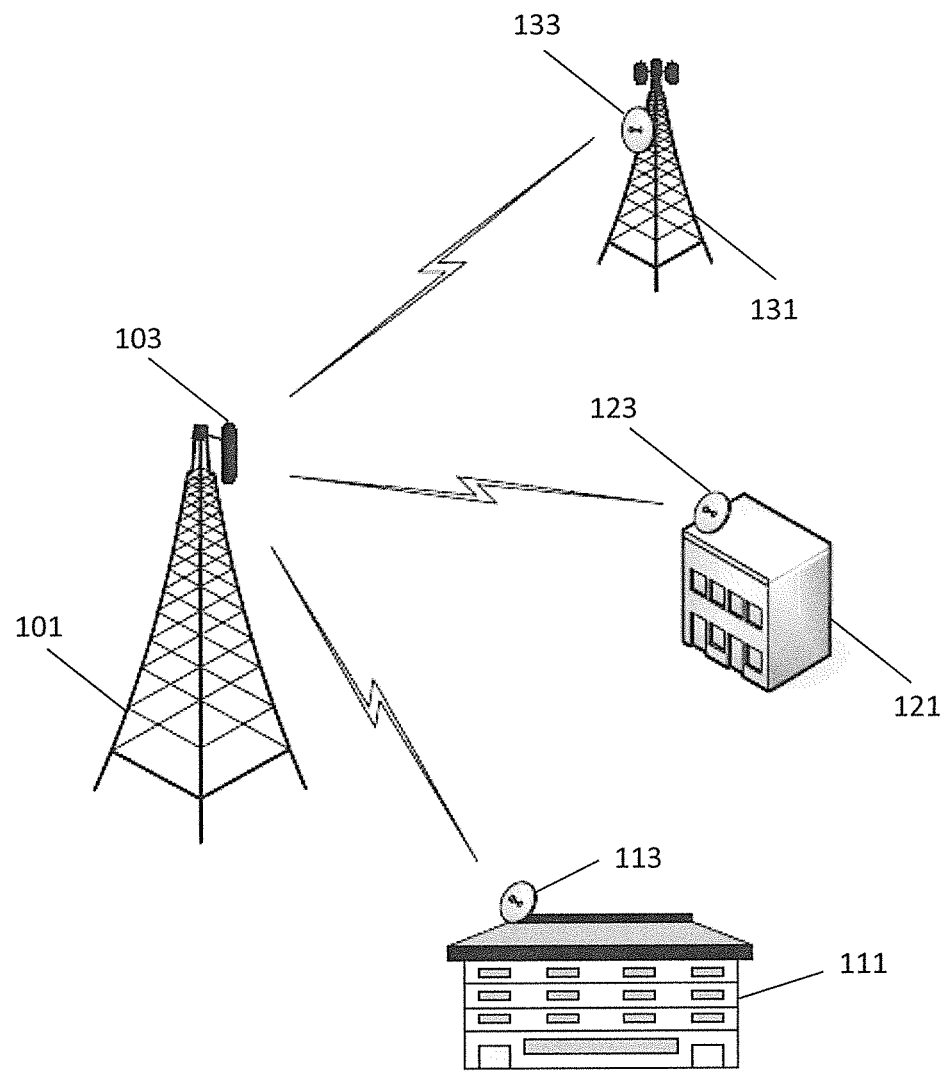
FIG. 1 is a diagram of a point-to-multipoint communication system in accordance with aspects of the invention.

FIG. 1 is a diagram of a point-to-multipoint communication system in accordance with aspects of the invention. The communication system includes a base station 101 that includes an antenna 103 for transmitting and receiving radio signals. The antenna 103 of the base station 101, in some embodiments, is a sector antenna and may have a beamwidth of, for example, 90 degrees. The base station 101 communicates with a first subscriber station 111 via an antenna 113 approximate the first subscriber station. The base station also communicates with a second subscriber station 121 via an antenna 123 approximate the second subscriber station and a third subscriber station 131 via an antenna 133 approximate the third subscriber station. The antennas of the subscriber stations are, in some embodiments, dish antennas with narrow beamwidths. The subscriber stations may be located at various types of facilities. For example, as illustrated in FIG. 1, a subscriber station may be at a residential building, an office building, or a tower of a mobile communication base station.

The base station and subscriber stations may communicate over links that are frequency division duplex. That is, a station may transmit at one frequency and receive at a different frequency. For example, the base station may transmit at a band from 24.25 GHz to 24.45 GHz and receive at a band from 25.05 GHz to 25.25 GHz, and these frequency bands may be considered to be about 25 GHz. In some embodiments, the base station and subscriber stations may communicate over links that are time division duplex. That is, a station may transmit at certain times and receive at other times, in various embodiments at the same frequency. Additionally, the subscriber stations may transmit to the base station in a time division scheme so that each subscriber station transmits at a different time.

The antennas at each station are coupled to radio frequency front ends (RFFE), that are in turn coupled to devices operating in other, usually lower frequencies which maybe termed baseband devices herein. Each RFFE generally includes a power amplifier for transmitting a microwave signal and a low noise amplifier for receiving a microwave signal. The RFFE may also include an upconverter and a downconverter to shift frequencies between the microwave signals at the antenna and lower frequency signals at the baseband device.

In some embodiments the baseband devices may be spatial division, time division devices, with for example spatial division features used, wholly or partially, to separate transmission channels and reception channels, and time division features used, wholly or partially, to separate transmissions by different devices. In some embodiments the baseband devices may be 802.11 devices, preferably 802.11n type devices or 802.11ac devices. 802.11n and 802.11ac devices, which employ multiple-input multiple-output (MIMO) signaling, for example may be considered spatial-division, time-division duplex devices; however, the system adapts the spatial-division signals for use in microwave links, including frequency division microwave links.

Figure 2:
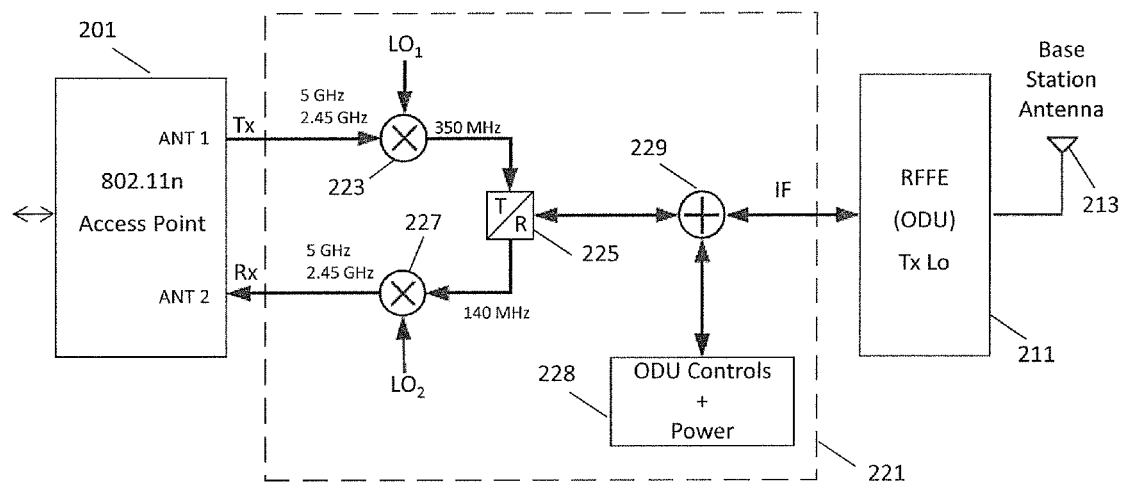
FIG. 2 is a simplified block diagram of a base station communication device in accordance with aspects of the invention.

FIG. 2 is a block diagram of a base station communication device in accordance with aspects of the invention. The communication device may be used, for example, at a base station in a point-to-multipoint microwave communication system. The base station may provide a point of presence (POP) for telecommunication links, for example a fiber optic system linked to the Internet or a common carrier communication network, or provide a data communication pathway to a POP, with the base station including circuitry to perform associated data processing or handling. The base station is in data communication with subscriber units by way of the communication device.

The base station communication device effectively couples, from a data standpoint, other components of the base station to subscriber units. The base station communication device receives and transmits digital signals from other components of the base station using wireless access point circuitry 201. The digital signals may be transmitted and received from the other components of the base station by way of an Ethernet link, for example. Additionally, the communication device may be powered via the Ethernet link, for example using Power over Ethernet (PoE) methods.

The wireless access point circuitry provides access point functions, including access point physical layer functions and Media Access Control ("MAC") functions for the network formed by the base station and the subscriber units. In the embodiment of FIG. 2, the wireless access point circuitry is a spatial division, time division device. Preferably the wireless access point circuitry 201 operates according to IEEE Std. 802.11n or 802.11ac, and 802.11n chips, chipsets, and devices are widely available, and in some embodiments, and as illustrated for convenience in FIG. 2, the wireless access point circuitry may be provided in the form of an 802.11n or 802.11ac device.

An adapter 221 couples the wireless access point circuitry 201 to the RFFE 211. The wireless access point circuitry transmits and receives radio frequency (RF) signals to and from the adapter, while the RFFE transmits and receives intermediate frequency (IF) signals to and from the adapter. The adapter therefore upconverts and downconverts signals as appropriate. The RFFE 211 is coupled to an antenna 213 for transmission and reception of microwave signals, with the microwave signal being transmitted to and received from for example subscriber units. The RFFE 211, in some embodiments, is configured as an outdoor unit (ODU). In some embodiments, the adapter 221 is positioned remotely from the RFFE 211, which for example may be positioned outdoors in the vicinity of the antenna, while the adapter is positioned approximate other base station components. The adapter 221 may be coupled to the RFFE 211 by a single coaxial cable.

The wireless access point circuitry includes at least two antenna ports, with two antenna ports as illustrated in FIG. 2. In most embodiments the wireless access point circuitry provides a MIMO capable device, supporting at least a 2×2:1 configuration, with one antenna port selected for transmission and one antenna port selected for reception, providing for spatial division of transmission and reception channels. In the event commercially available 802.11n or 802.11ac devices are utilized for the wireless access point circuitry, preferably such devices allow for explicit selection of antenna port usage, for example by way of register settings or otherwise.

The adapter 221 is coupled to a first antenna port of the wireless access point circuitry 201 to receive a radio frequency signal transmitted from the wireless access point circuitry 201. The adapter 221 is also coupled to a second antenna port of the wireless access point circuitry 201 to supply a radio frequency signal to the wireless access point circuitry 201. In most embodiments the connections are by way of wired connections, as opposed to wireless connections. The wireless access point circuitry 201 is configured to operate the first antenna port as a transmit-only antenna and the second antenna port as a receive-only antenna. In various embodiments, the antenna ports of the wireless access point 201 operate at frequencies from 2.4 GHz to 2.5 GHz referred to herein as a 2.4 GHz band or at frequencies from about 4.9 GHz to about 6 GHz referred to herein as a 5 GHz band.

In the adapter, a transmit mixer 223 mixes the signal transmitted from the first antenna port of the wireless access point circuitry 201 with a first local oscillator signal $LO_1$. The output of the transmit mixer 223 is an intermediate frequency transmit signal that will be upconverted for microwave transmission by the RFFE 211. For example, the transmit signal may be at 2.45 GHz and the first local oscillator signal may be at a frequency of 2.10 GHz to produce an intermediate frequency transmit signal at 350 MHz. The frequency of the intermediate frequency transmit signal may be tuned by adjusting the frequency of the first local oscillator signal and/or the frequency of the signal provided by the wireless access point circuitry through the first antenna port. The transmit mixer 223 preferably has low phase noise to avoid impairing the signal transmitted from the communication device.

A diplexer 225 receives the intermediate frequency transmit signal and supplies the signal to a combiner 229. The combiner 229 combines the intermediate frequency transmit signal with power and control signals from a control block 228. The power signal is typically a DC signal and the control signals are low frequency, relative to the intermediate frequency, and control operation of the RFFE 211, such as transmit power levels and microwave frequencies. The combined signals from the combiner 229 are supplied to the RFFE 211, which upconverts the intermediate frequency transmit signal to a microwave signal for transmission via the antenna 213.

The diplexer 225 also receives, via the combiner 229, an intermediate frequency receive signal from the RFFE 211. The intermediate frequency receive signal is a downconverted version of the microwave signal received by the antenna 213. The diplexer 225 separates the intermediate frequency receive signal and supplies it to a receive mixer 227 that mixes the intermediate frequency receive signal with second local oscillator signal $LO_2$. The output of the receive mixer 227 is supplied to the second antenna port of the wireless access point 201. The receive mixer 227 upconverts the intermediate frequency receive signal to the frequency of the wireless access point circuitry 201. For example, the intermediate frequency receive signal may be at 140 MHz and the second local oscillator signal may be at a frequency of 2.31 GHz to supply a signal to the wireless access point 201 at 2.45 GHz. The frequency of the intermediate frequency receive signal may be tuned by adjusting the frequency of the second local oscillator signal and/or adjusting the frequency of the signal expected to be received by the wireless access point 201 on the second antenna port. The receive mixer 227 preferable has low phase noise to avoid impairing the signal supplied to the wireless access point 201.

In various embodiments the local oscillator signals $LO_1$ and $LO_2$ may be frequency locked to corresponding signals of a subscriber station communication device in communication with the base station. In various embodiments the frequency locking may be accomplished by using a GPS reference signal at both stations, a pilot tone communicated between the two stations, use of very stable oscillators at both stations, or other methods.

Figure 3:
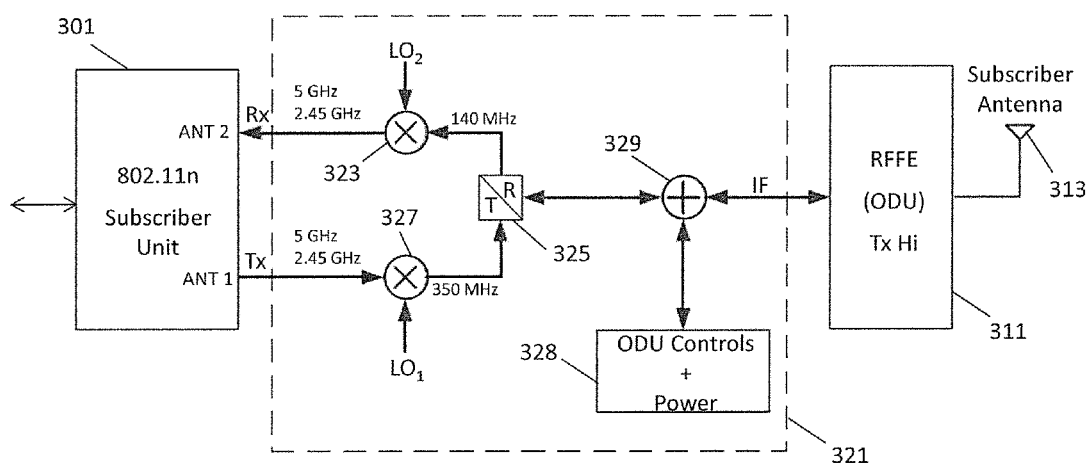
FIG. 3 is a simplified block diagram of subscriber communication device in accordance with aspects of the invention.

FIG. 3 is a block diagram of a subscriber unit communication device in accordance with aspects of the invention. The communication device may be used, for example, at a subscriber station in a point-to-multipoint microwave communication system. The subscriber unit communication device of FIG. 3 is configured to receive a microwave signal transmitted from the base station communication device of FIG. 2 and vice versa. The communication device of FIG. 3 is similar to the communication device of FIG. 2, with the wireless access point circuitry being replaced by wireless subscriber unit circuitry. In various embodiments, however, the circuitry to provide the wireless access point functions may be the same as the circuitry to provide the wireless subscriber unit functions, or partially or completely separate circuitry to provide both functions may be provided together in a single device.

In somewhat more detail, similar to the base station communication device, the subscriber unit communication device has wireless subscriber unit circuitry 301 for interfacing with subscriber system components, such as a subscriber system local area network. Radio frequency data to and from the wireless subscriber unit circuitry is upconverted or downconverted to IF by an adapter 321, which is coupled to an RFFE 311, which communicates using microwave signals with a base station.

The wireless subscriber unit circuitry 301 sends and receives data to subscriber system components, for example in the form of a local area network at a subscriber's premises. The data between the wireless subscriber unit circuitry and the local area network may be communicated, for example, using Ethernet protocols. The wireless subscriber unit circuitry performs wireless network subscriber unit functions, for example physical layer functions and MAC functions. Preferably the functions are performed in accordance with 802.11n or 802.11ac, with the wireless subscriber unit having at least two antenna ports and being a MIMO capable device, supporting at least a 2×2:1 configuration. As with the wireless access point circuitry, the wireless subscriber unit circuitry includes a first antenna port and a second antenna port, with one of the ports, for example the first antenna port, configured to provide radio frequency transmit data and the other port, for example the second antenna port, configured to receive radio frequency receive data. As with the communication device of FIG. 2, in most embodiments the couplings or connections between the antenna ports and the adapter are wired couplings or connections, as opposed to wireless couplings or connections. Also as with the wireless access point circuitry, preferably the wireless subscriber unit circuitry can be configured to have one antenna port configured for transmit data and one antenna port configured for receive data, for example through the use of register settings.

As with the base station adapter, using a mixer 327, the subscriber unit adapter 321 downconverts radio frequency transmit data to an intermediate frequency expected to be received by an RFFE 311, and using a mixer 323 upconverts an intermediate frequency signal provided by the RFFE to a radio frequency signal expected to be received by the wireless subscriber unit circuitry. A diplexer 325 is in the signal path between the RFFE and the mixers, with the diplexer splitting the signals to and from the mixers. As illustrated in the embodiment of FIG. 3, a combiner 329 is in a signal path between the diplexer and the RFFE. The combiner allows for insertion and removal of control signals from the intermediate frequency signals.

The RFFE receives or transmits the intermediate frequency signals from or to the adapter, and upconverts or downconverts the respective intermediate frequency signals to or from microwave signals, which are transmitted or received by an antenna 313. The microwave signals are generally communicated to or from a base station. In various embodiments the local oscillator signals may be frequency locked to corresponding local oscillator signals in the base station, for example as discussed with respect to FIG. 2.

Figure 4:
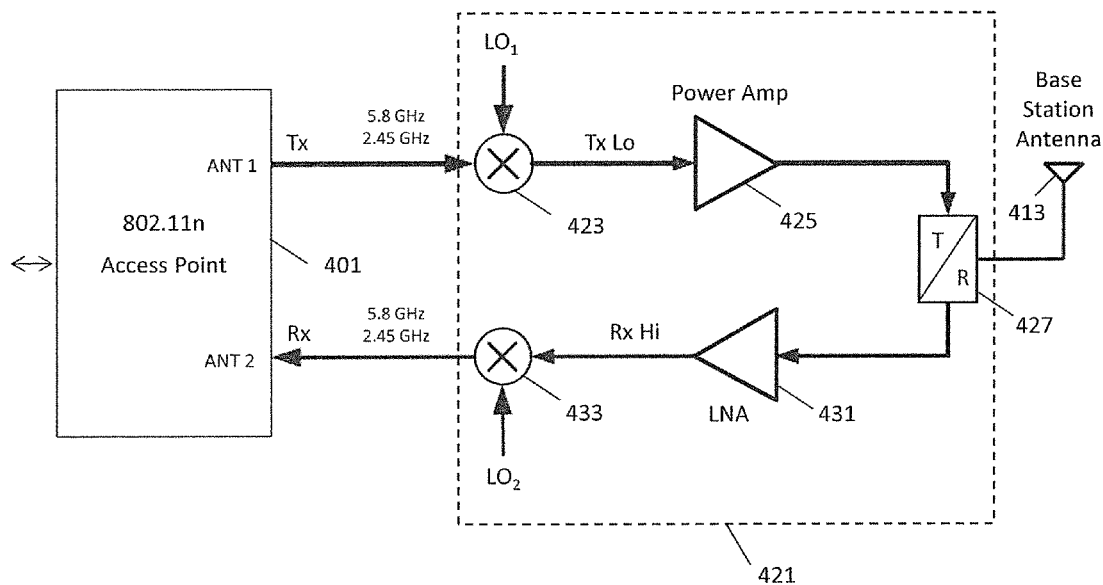
FIG. 4 is a simplified block diagram of another base station communication device in accordance with aspects of the invention.

FIG. 4 is a block diagram of another base station communication device in accordance with aspects of the invention. The communication device may be used, for example, at a base station in a point-to-multipoint microwave communication system. The communication device of FIG. 4 is similar to the communication device of FIG. 2. The communication device of FIG. 4 receives and transmits digital signals from and to other components of the base station using wireless access point circuitry 401 and transmits and receives microwave signals to and from subscriber stations, a plurality of subscriber stations in most embodiments, via an antenna 413. The microwave signals, which may be termed microwave communication signals herein, may be in any band of microwave frequencies, in some embodiments between 6 GHz and 40 GHz for point-to-multipoint microwave communication. As an example microwave communication signals may be at about 25 GHz, and particularly in the band of frequencies from about 24.25 GHz to about 24.45 GHz and from about 25.05 GHz to about 25.25 GHz in some embodiments. In various embodiments the microwave signals may be in any band of microwave frequencies between 6 GHz and 40 GHz. In some embodiments microwave signals are in a block of frequencies about one or all of 28 GHz, 31 GHz, and/or 39 GHz.

The wireless access point circuitry 401 may be similar to or the same as the wireless access point circuitry of the embodiment of FIG. 2. The wireless access point circuitry performs wireless access point functions, including physical layer functions and MAC functions, and for example including access point communication medium contention related processing, preferably in accordance with 802.11n or 802.11ac. The wireless access point circuitry is configured to operate a first antenna port as a transmit-only antenna and a second antenna port as a receive-only antenna, providing for spatial multiplexing of transmit and receive channels. In various embodiments, the antenna ports of the wireless access point 401 operate at frequencies about 2.4 or 5 GHz. A signal transmitted from the first antenna port is supplied to a transmit mixer 423, in most embodiments by way of wired, as opposed to wireless, couplings or connections. The transmit mixer 423 mixes the transmit signal from the wireless access point 401 with a first local oscillator signal $LO_1$ to upconvert the transmit signal from the wireless access point 401 to a microwave transmit signal. For example, the transmit signal from the wireless access point 401 may be at 5.8 GHz and the first local oscillator signal may be at a frequency of 18.45 GHz to produce the microwave transmit signal at 24.25 GHz. The frequency of the microwave transmit signal may be tuned by adjusting the frequency of the first local oscillator signal and/or the frequency of the transmit signal from the wireless access point 401. The microwave transmit signal is amplified by power amplifier 425 and coupled to the antenna 413 by a diplexer 427.

The diplexer 427 also supplies a microwave signal received by the antenna to a low noise amplifier 431. The low noise amplifier 431 supplies an amplified version of the microwave receive signal to a receive mixer 433 that mixes the microwave receive signal with second local oscillator signal $LO_2$. The output of the receive mixer 433 is supplied to the second antenna port of the wireless access point 401, in most embodiments by way of a wired, as opposed to wireless, couplings or connections. The receive mixer 433 downconverts from the microwave signal frequency to the frequency of the wireless access point 401. For example, the microwave receive signal may be at 25.05 GHz and the second local oscillator signal may be at a frequency of 19.25 GHz to supply the signal to the wireless access point 401 at 5.8 GHz. Frequency tuning of the microwave receive signal may be effected by adjusting the frequency of the second local oscillator signal and/or tuning of the signal received by the wireless access point 401. In contrast to the communication device of FIG. 2, the communication device of FIG. 4 converts between the frequencies of the wireless access point and the microwave frequencies directly without producing intermediate frequency signals.

In some embodiments the local oscillators, power amplifiers, low noise amplifier, and diplexer may be part of a microwave RFFE 421. In various embodiments the local oscillators may be frequency locked with corresponding local oscillator signals of subscriber stations, for example as discussed with respect to FIG. 2.

Figure 5:
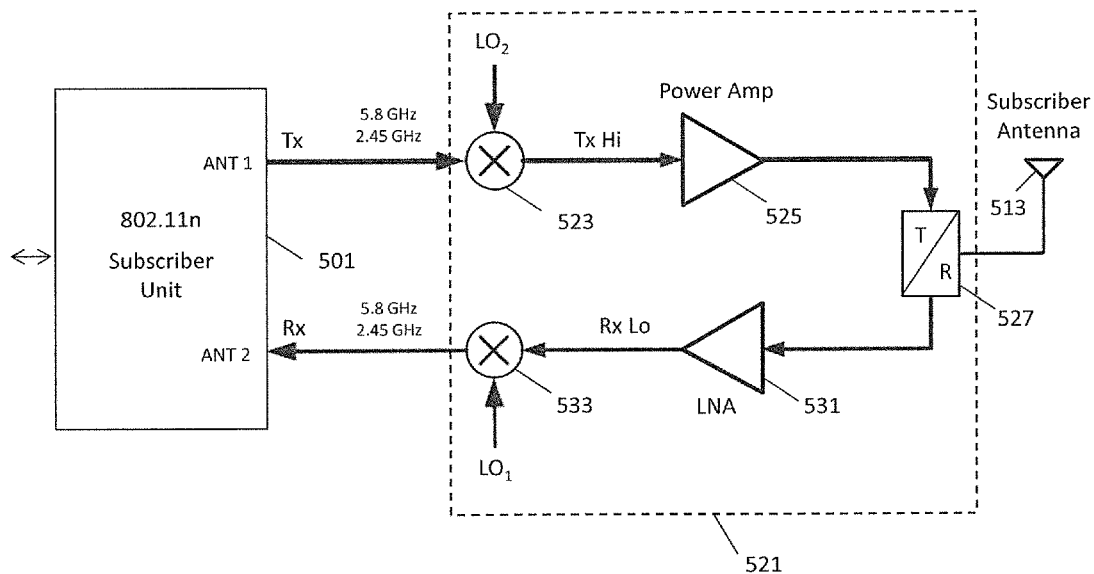
FIG. 5 is a simplified block diagram of another subscriber communication device in accordance with aspects of the invention.

FIG. 5 is a block diagram of another subscriber unit communication device in accordance with aspects of the invention. The communication device may be used, for example, at a subscriber station in a point-to-multipoint microwave communication system. The communication device of FIG. 5 is configured, in a communications network, to receive a microwave signal transmitted from the communication device of FIG. 4 and vice versa. The communication device of FIG. 5 may also be used with the communication device of FIG. 2, and the communication device of FIG. 4 may also be used with the communication device of FIG. 3. The communication device of FIG. 5 is similar to the communication device of FIG. 4. However, wireless subscriber unit circuitry is utilized in place of wireless access point circuitry, although in some embodiments common circuitry may provide both wireless access point functions and wireless subscriber unit functions. The wireless subscriber unit provides for spatial multiplexing of transmit and receive channels, for example through the use of different wireless subscriber unit circuitry antenna ports for transmission and receive channels. The wireless subscriber unit circuitry also provides, in many embodiments, contention avoidance functions in multi-subscriber unit environments, for example through the use of time division communication schemes.

In the communication device of FIG. 5, the wireless subscriber unit circuitry is in data communication with other components of a subscriber station, for example by way of a wired connection utilizing Ethernet communication protocols. The wireless subscriber unit circuitry provides subscriber unit functions, including physical layer functions and MAC functions, preferably in accordance with 802.11n or 802.11ac. A first antenna port of the wireless subscriber unit circuitry is configured for transmit-only operation, with the first antenna port coupled to a transmit mixer 523. The transmit mixer upconverts a signal from the first antenna port to a microwave transmit signal, which is amplified by a power amplifier 525 and sent to an antenna 513 by way of a diplexer 527. As with the device of FIG. 4, in most embodiments the coupling or connection between the first antenna port and the mixer is a wired, as opposed to wireless, coupling or connection.

The diplexer also supplies a microwave signal received by the antenna to a low noise amplifier 531. The amplified received microwave signal is downconverted by a receive mixer 533, with the downconverted signal having a frequency about a frequency expected to be received by the wireless subscriber unit circuitry. The downconverted signal is provided to a second antenna port of the wireless subscriber unit circuitry, with the second antenna port configured for receive-only operation. As with the device of FIG. 4, in most embodiments the coupling or connection between the second antenna port and the mixer is a wired, as opposed to wireless, coupling or connection.

In some embodiments the local oscillators, power amplifiers, low noise amplifier, and diplexer may be part of a microwave RFFE 521. In various embodiments the local oscillators may be frequency locked with corresponding local oscillator signals of a base station, for example as discussed with respect to FIG. 2.

Figure 6:
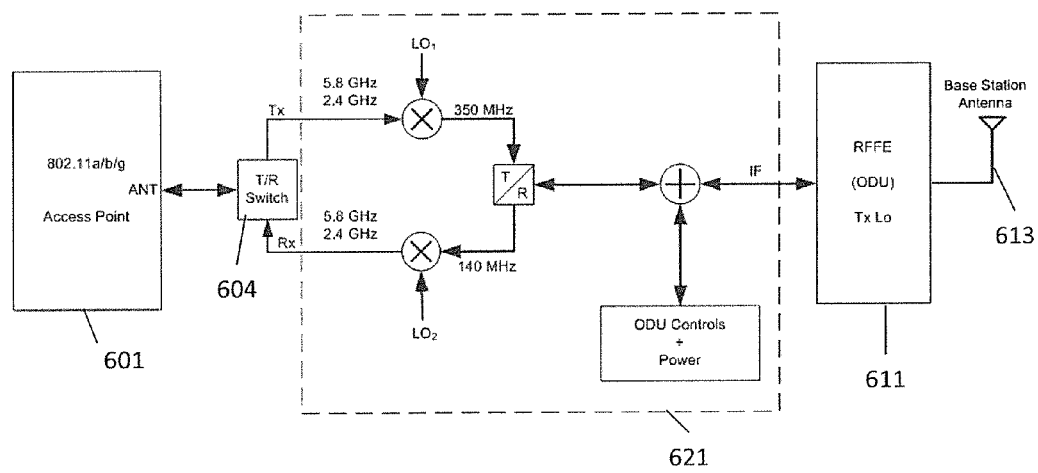
FIG. 6 is a simplified block diagram of a further embodiment of a base station communication device in accordance with aspects of the invention.

FIG. 6 is a block diagram of a further embodiment of a base station communication device in accordance with aspects of the invention. The embodiment of FIG. 6 is similar to the embodiment of FIG. 2, with wireless access point circuitry 601 in data communication with other portions of a base station, by way of for example an Ethernet connection. The wireless access point circuitry is also in data communication with subscriber units by way of a transmit/receive switch 604, an adapter 621, an RFFE 611, and a microwave antenna 613. In the embodiment of FIG. 6, however, the transmit/receive switch 604, not present in the embodiment of FIG. 2, provides for separation of transmit and receive communication channels, with the wireless access point circuitry 601 providing time division access point functions in, for example, a multi-subscriber unit environment. As the transmit/receive switch provides for separation of transmit and receive channels, the wireless access point circuitry need not provide MIMO functions, and the wireless access point circuitry may provide, as illustrated in FIG. 6, a single antenna port, connected or coupled in most embodiments to the transmit receive switch by wired, as opposed to wireless, connections or couplings. In various embodiments the wireless access point circuitry operates in conformance with 802.11a, 802.11b, or 802.11g, and may be comprised of an 802.11a, 802.11b, or 802.11g chip, chipset, or device. Also, in various embodiments frequency of operation of local oscillators used for upconverting and downconverting signals in the transmit and receive channels may be different than those of the embodiment of FIG. 2, to account for differing frequencies that may be transmitted or expected to be received by the wireless access point circuitry. In various embodiments the local oscillators may be frequency locked with corresponding local oscillator signals of subscriber stations, for example as discussed with respect to FIG. 2.

Figure 7:
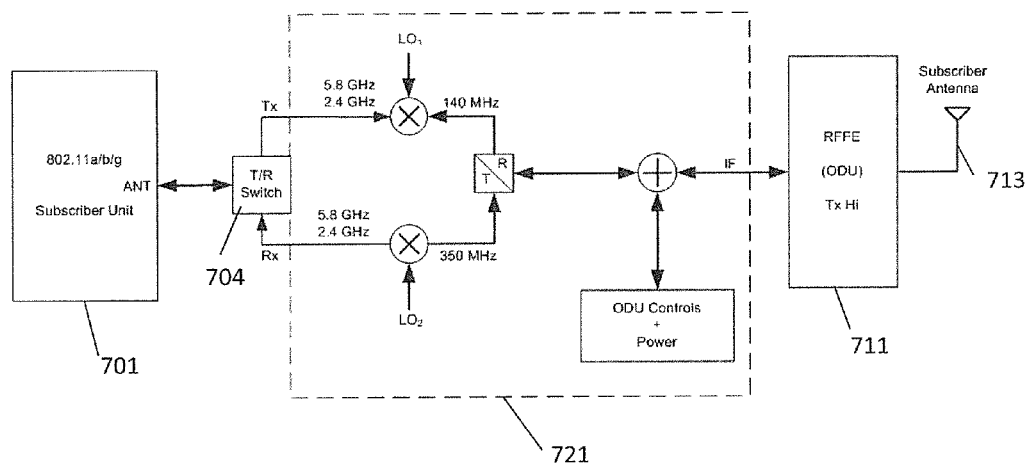
FIG. 7 is a simplified block diagram of a further embodiment of a subscriber unit communication device in accordance with aspects of the invention.

FIG. 7 is a block diagram of a further embodiment of a subscriber unit communication device in accordance with aspects of the invention. The embodiment of FIG. 7 is similar to the embodiment of FIG. 3, with wireless subscriber circuitry 701 in data communication with other portions of a subscriber unit, by way of for example an Ethernet connection, and a base station by way of a transmit/receive switch 704, an adapter 721, an RFFE 711, and a microwave antenna 713. In the embodiment of FIG. 7, however, the transmit/receive switch 704, not present in the embodiment of FIG. 3, provides for separation of transmit and receive communication channels, with the wireless subscriber unit circuitry 701 providing time division subscriber unit functions in, for example, a multi-subscriber unit environment. As the transmit/receive switch provides for separation of transmit and receive channels, the wireless subscriber unit circuitry need not provide MIMO functions, and the wireless subscriber unit circuitry may provide, as illustrated in FIG. 6, a single antenna port. In most embodiments the antenna port is connected or coupled to the transmit/receive switch by wired connections or couplings. In various embodiments the wireless subscriber unit circuitry operates in conformance with 802.11a, 802.11b, or 802.11g, and may be comprised of an 802.11a, 802.11b, or 802.11g chip, chipset, or device. Also, in various embodiments frequency of operation of local oscillators used for upconverting and downconverting signals in the transmit and receive channels may be different than those of the embodiment of FIG. 3, to account for differing frequencies that may be transmitted or expected to be received by the wireless access point circuitry. In various embodiments the local oscillators may be frequency locked with corresponding local oscillator signals of a base station, for example as discussed with respect to FIG. 2.

Figure 8:
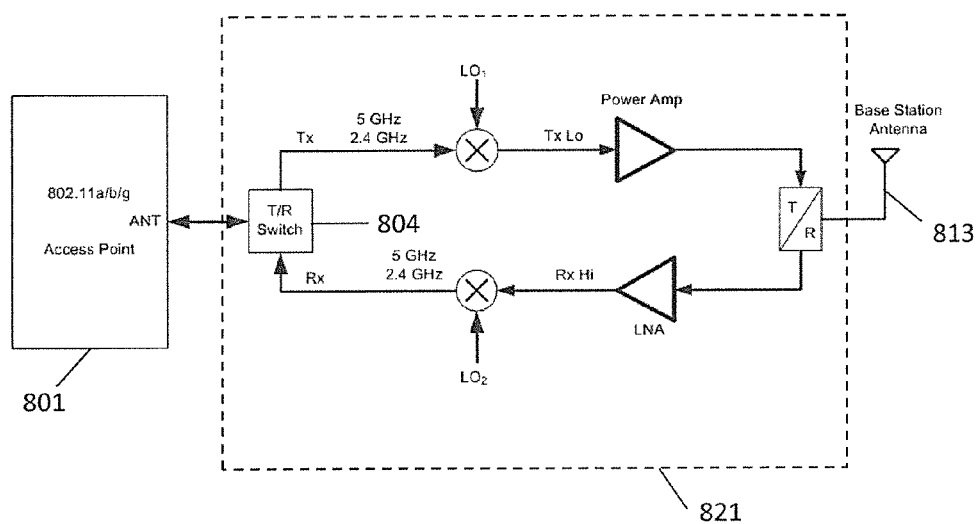
FIG. 8 is a simplified block diagram of a further embodiment of a base station communication device in accordance with aspects of the invention.

FIG. 8 is a block diagram of a further embodiment of a base station communication device in accordance with aspects of the invention. The embodiment of FIG. 8 is similar to the embodiment of FIG. 4, with wireless access point circuitry 801 in data communication with other portions of a base station, by way of for example an Ethernet connection, and, by way of an RFFE 821 including a transmit/receive switch 804, a microwave antenna 813 for communicating with subscriber units. In the embodiment of FIG. 8, however, the transmit/receive switch 804 provides for separation of transmit and receive communication channels, with the wireless access point circuitry 801 providing time division access point functions in, for example, a multi-subscriber unit environment. As the transmit/receive switch provides for separation of transmit and receive channels, the wireless access point circuitry need not provide MIMO functions, and the wireless access point circuitry may provide, as illustrated in FIG. 8, a single antenna port. In most embodiments the antenna port is connected or coupled to the transmit/receive switch by way of wired, as opposed to wireless, connection or coupling. In various embodiments the wireless access point circuitry operates in conformance with 802.11a, 802.11b, or 802.11g, and may be comprised of an 802.11a, 802.11b, or 802.11g chip, chipset, or device. Also, in various embodiments frequency of operation of local oscillators used for upconverting and downconverting signals in the transmit and receive channels may be different than those of the embodiment of FIG. 4, to account for differing frequencies that may be transmitted or expected to be received by the wireless access point circuitry. In various embodiments the local oscillators may be frequency locked with corresponding local oscillator signals of subscriber stations, for example as discussed with respect to FIG. 2.

Figure 9:
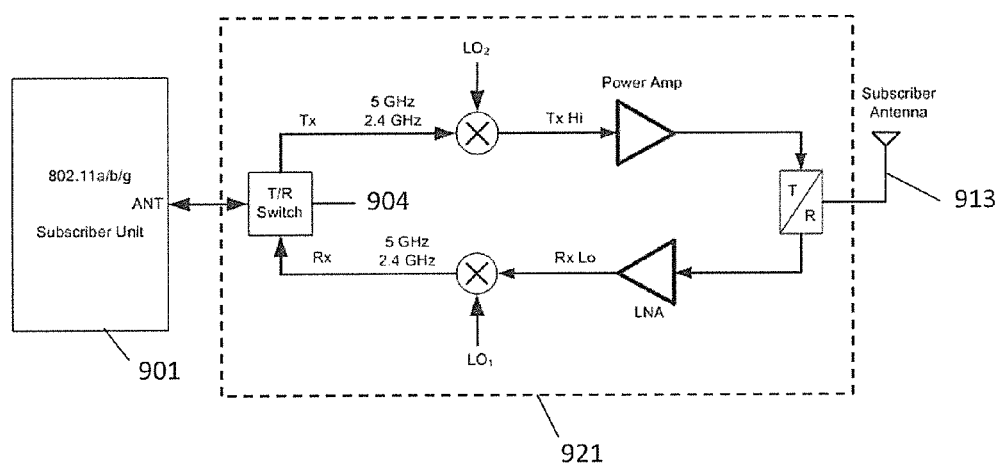
FIG. 9 is a simplified block diagram of a further embodiment of a subscriber unit communication device in accordance with aspects of the invention.

FIG. 9 is a block diagram of a further embodiment of a subscriber unit communication device in accordance with aspects of the invention. The embodiment of FIG. 9 is similar to the embodiment of FIG. 5, with wireless subscriber circuitry 901 in data communication with other portions of a subscriber unit, by way of for example an Ethernet connection, and, by way of an RFFE 921 including a transmit/receive switch 904, a microwave antenna 913 for communicating with a base station. In the embodiment of FIG. 7, however, the transmit/receive switch 904 provides for separation of transmit and receive communication channels, with the wireless subscriber unit circuitry 901 providing time division subscriber unit functions in, for example, a multi-subscriber unit environment. As the transmit/receive switch provides for separation of transmit and receive channels, the wireless subscriber unit circuitry need not provide MIMO functions, and the wireless subscriber unit circuitry may provide, as illustrated in FIG. 9, a single antenna port. In most embodiments the antenna port is connected or coupled to the transmit/receive switch by way of wired, as opposed to wireless, connections or couplings. In various embodiments the wireless subscriber unit circuitry operates in conformance with 802.11a, 802.11b, or 802.11g, and may be comprised of an 802.11a, 802.11b, or 802.11g chip, chipset, or device. Also, in various embodiments frequency of operation of local oscillators used for upconverting and downconverting signals in the transmit and receive channels may be different than those of the embodiment of FIG. 5, to account for differing frequencies that may be transmitted or expected to be received by the wireless access point circuitry. In various embodiments the local oscillators may be frequency locked with corresponding local oscillator signals of a base station, for example as discussed with respect to FIG. 2.

Figure 10:
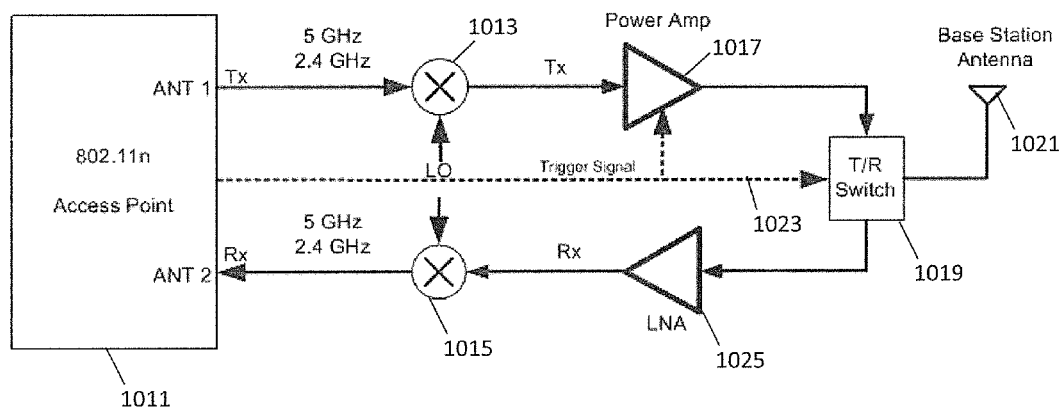
FIG. 10 is a simplified block diagram of a further embodiment of a subscriber unit communication device in accordance with aspects of the invention.

FIG. 10 is a block diagram of a base station in accordance with aspects of the invention. The base station of FIG. 10 is similar to the base station of FIG. 4, and except as discussed below the discussion relating to the base station of FIG. 4 applies to the base station of FIG. 10.

For the base station of FIG. 10, microwave signals are transmitted from and received by a base station antenna 1021. In the system of FIG. 10, the transmitted and received microwave signals are both at the same frequency, with the microwave communications being time duplexed instead of being frequency duplexed, as for example in implementations of the base station of FIG. 4. Accordingly, in the base station of FIG. 10, a transmit path from a transmit antenna port of wireless access point circuitry 1011 includes a transmit/receive switch 1019, in addition to a frequency converter 1013 and a power amplifier 1017. The receive path to a receive antenna port of the wireless access point circuitry similarly includes the transmit/receive switch, in addition to a low noise amplifier 1025 and a frequency converter 1015. As transmitted and received signals are nominally at the same frequency, a common local oscillator signal may be used in various embodiments for both frequency converters.

The transmit/receive switch and the power amplifier also receive an on/off trigger signal from the wireless access point circuitry. The trigger signal places the transmit/receive switch in either transmit mode or receive mode. The trigger signal also enables and disables the power amplifier, enabling the power amplifier so as to allow transmission of data, and disabling the power amplifier when the system is not transmitting data so as to not overwhelm received signals.

Figure 11:
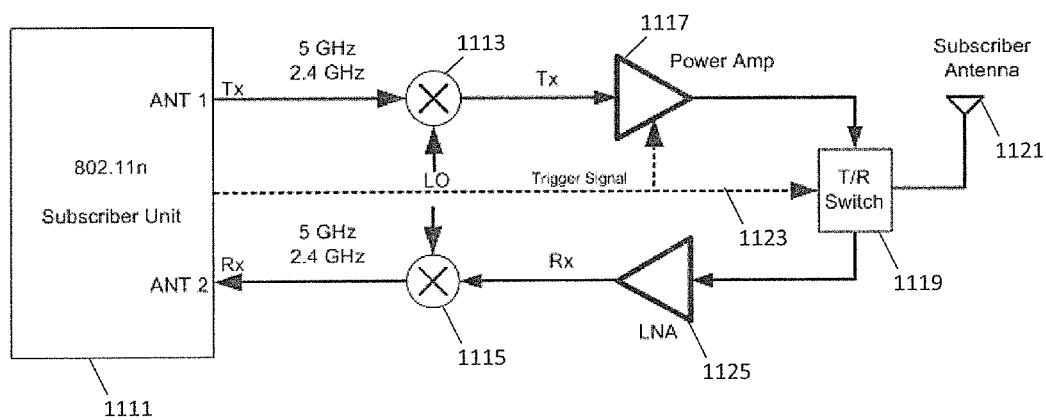
FIG. 11 is a simplified block diagram of a further embodiment of a subscriber unit communication device in accordance with aspects of the invention.

FIG. 11 is a block diagram of a subscriber station in accordance with aspects of the invention. Similar to the discussion with respect to the corresponding base station of FIG. 10, the subscriber station of FIG. 11 is similar to the subscriber station of FIG. 5.

For the subscriber station of FIG. 11, microwave signals are transmitted from and received by a subscriber station antenna 1121. In the system of FIG. 11, the transmitted and received microwave signals are both at the same frequency, with the microwave communications being time duplexed instead of being frequency duplexed, as for example in implementations of the base station of FIG. 5. Accordingly, in the subscriber station of FIG. 11, a transmit path from a transmit antenna port of wireless subscriber unit circuitry 1111 includes a transmit/receive switch 1119, in addition to a frequency converter 1113 and a power amplifier 1117. The receive path to a receive antenna port of the wireless subscriber unit circuitry similarly includes the transmit/ receive switch, in addition to a low noise amplifier 1125 and a frequency converter 1115. As transmitted and received signals are nominally at the same frequency, a common local oscillator signal may be used in various embodiments for both frequency converters.

The transmit/receive switch and the power amplifier also receive an on/off trigger signal from the wireless subscriber unit circuitry. The trigger signal places the transmit/receive switch in either transmit mode or receive mode. The trigger signal also enables and disables the power amplifier, enabling the power amplifier so as to allow transmission of data, and disabling the power amplifier when the system is not transmitting data so as to not overwhelm received signals.

Although the invention has been described with respect to various embodiments, it should be recognize that the invention comprises the novel and non-obvious claims supported by this disclosure, along with their insubstantial variations.

What is claimed is:

1. A subscriber unit communication device for a microwave communication system, comprising:
    wireless subscriber unit circuitry including an antenna port, the wireless subscriber unit circuitry providing for time duplexed communications through the antenna port;
    a first transmit/receive switch coupled to the antenna port of the wireless subscriber unit circuitry by way of a wired coupling;
    a second transmit/receive switch;
    at least one transmit mixer coupled to upconvert a signal from the first transmit/receive switch to microwave communication frequencies, the at least one transmit mixer in a first signal path between the first transmit/receive switch and the second transmit/receive switch; and
    at least one receive mixer to downconvert a received signal from microwave communication frequencies, the at least one receive mixer in a second signal path between the second transmit/receive switch and the first transmit/receive switch;
    wherein the wireless subscriber unit circuitry is coupled to components of a subscriber system by way of a wired Ethernet connection.

2. The subscriber unit communication device of claim 1, wherein the wireless subscriber unit circuitry comprises an 802.11a, 802.11b, or 802.11g chip or chipset.

3. The subscriber unit communication device of claim 1, wherein the wireless subscriber unit circuitry comprises an 802.11ac or 802.11n chip or chipset.

4. The subscriber unit communication device of claim 1, wherein the at least one transmit mixer, and the at least one receive mixer are part of a radio frequency front end (RFFE).

5. The subscriber unit communication device of claim 4, wherein the at least one transmit mixer and the at least one receive mixer are coupled to a microwave antenna for communicating with a base station.

6. The subscriber unit communication device of claim 5, wherein the at least one transmit mixer is coupled to the microwave antenna by a power amplifier and the second transmit/receive switch, and the at least one receive mixer is coupled to the microwave antenna by a low noise amplifier and the second transmit/receive switch.

7. The subscriber unit communication device of claim 1, wherein the second transmit/receive switch is coupled to a microwave antenna, for communicating with a base station, by way of a radio frequency front end (RFFE).

8. The subscriber unit communication device of claim 7, further comprising a combiner for insertion of control signals, the combiner in a signal path between the second transmit/receive switch and the RFFE.

9. The subscriber unit communication device of claim 1, wherein the microwave communications frequencies comprise frequencies between 6 GHz and 40 GHz.

10. A method useful in providing microwave communications, comprising:
    presenting a signal for transmission on an antenna port of wireless subscriber unit circuitry during a first time period, the wireless subscriber circuitry in data communication with other portions of a subscriber unit by way of an Ethernet connection;
    providing, using a wired connection from the antenna port, the signal for transmission to frequency conversion circuitry;
    upconverting the signal for transmission to a microwave communication frequency using the frequency conversion circuitry, thereby providing an upconverted signal for transmission;
    amplifying the upconverted signal for transmission;
    transmitting the amplified upconverted signal for transmission, using a microwave antenna, to a base station;
    downconverting an amplified received signal from a microwave communications frequency; and
    providing, using the wired connection from the antenna port, the downconverted amplified received signal to the antenna port of the wireless subscriber unit circuitry during a second time period.

11. The method of claim 10, wherein the wireless subscriber unit circuitry comprises an 802.11a, 802.11b, or 802.11g chip or chipset.

12. The method of claim 10, wherein the wireless subscriber unit circuitry comprises an 802.11ac or 802.11n chip or chipset.

13. The method of claim 10, wherein the wired connection from the antenna port of the wireless subscriber unit circuitry connects the antenna port with a first transmit/receive switch.

14. The method of claim 13, wherein providing the signal for transmission to the frequency conversion circuitry comprises providing the signal for transmission to the frequency conversion circuitry by way of the first transmit/receive switch.

15. The method of claim 13, wherein providing the downconverted amplified received signal to the antenna port of the wireless subscriber unit circuitry comprises providing the downconverted amplified received signal to the antenna port of the wireless subscriber unit circuitry by way of the first transmit/receive switch.

16. The method of claim 13, further comprising receiving a received signal using the microwave antenna, and amplifying the received signal using a low noise amplifier (LNA) to obtain the amplified received signal.

17. The method of claim 10, wherein the microwave communications frequency is a frequency between 18 GHz and 10 GHz.

18. The method of claim 10, wherein the downconverting the amplified signal from the microwave communications frequency is performed by the frequency conversion circuitry.

19. The method of claim 18, wherein the frequency conversion circuitry comprises a first mixer and a second mixer.

* * * * *